United States Patent
Napigkit

(10) Patent No.: US 8,621,516 B2
(45) Date of Patent: Dec. 31, 2013

(54) APPARATUS, SYSTEMS AND METHODS FOR PROVIDING TRAVEL INFORMATION RELATED TO A STREAMING TRAVEL RELATED EVENT

(75) Inventor: Darius Napigkit, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 168 days.

(21) Appl. No.: 13/083,974

(22) Filed: Apr. 11, 2011

(65) Prior Publication Data

US 2012/0260289 A1 Oct. 11, 2012

(51) Int. Cl.
G06F 3/00 (2006.01)
G06F 13/00 (2006.01)
H04N 5/445 (2011.01)

(52) U.S. Cl.
USPC .................................. 725/42; 725/40; 725/41

(58) Field of Classification Search
None
See application file for complete search history.

(56) References Cited

U.S. PATENT DOCUMENTS

| | | | | |
|---|---|---|---|---|
| 5,359,367 A * | 10/1994 | Stockill | .......................... | 725/137 |
| 5,781,228 A * | 7/1998 | Sposato | .......................... | 725/32 |
| 5,835,717 A * | 11/1998 | Karlton et al. | .................. | 725/46 |
| 5,838,362 A * | 11/1998 | Furuya et al. | ................... | 725/92 |
| 6,177,931 B1 * | 1/2001 | Alexander et al. | ............. | 725/52 |
| 6,757,911 B1 * | 6/2004 | Shimoji et al. | ................ | 725/136 |
| 6,868,400 B1 * | 3/2005 | Sundaresan et al. | ............ | 705/37 |
| 7,082,400 B2 * | 7/2006 | Jones et al. | ........................ | 705/6 |
| 7,237,253 B1 | 6/2007 | Blackketter et al. | | |
| 7,244,180 B2 * | 7/2007 | McHugh | ........................ | 463/40 |
| 7,349,894 B2 * | 3/2008 | Barth et al. | ........................... | 1/1 |
| 7,711,774 B1 * | 5/2010 | Rothschild | ..................... | 709/205 |
| 7,865,306 B2 * | 1/2011 | Mays | ............................. | 701/437 |
| 7,984,472 B2 * | 7/2011 | Incentis Carro | ............. | 725/112 |
| 7,987,491 B2 * | 7/2011 | Reisman | ........................ | 725/112 |
| 8,200,257 B2 * | 6/2012 | Ting et al. | ..................... | 455/466 |
| 8,321,126 B2 * | 11/2012 | Mays | ............................ | 701/428 |
| 8,402,491 B2 * | 3/2013 | Lee et al. | ......................... | 725/53 |
| 8,484,670 B2 * | 7/2013 | Klein et al. | ....................... | 725/23 |
| 2002/0040482 A1 * | 4/2002 | Sextro et al. | ................... | 725/136 |
| 2002/0157096 A1 * | 10/2002 | Hane et al. | ....................... | 725/46 |
| 2003/0041159 A1 * | 2/2003 | Tinsley et al. | ................. | 709/231 |
| 2003/0172376 A1 * | 9/2003 | Coffin, III | ....................... | 725/22 |
| 2004/0117819 A1 * | 6/2004 | Yu | ................................... | 725/32 |
| 2004/0268401 A1 | 12/2004 | Gray et al. | | |
| 2004/0268418 A1 | 12/2004 | Gray et al. | | |
| 2005/0166247 A1 | 7/2005 | Blackketter et al. | | |
| 2005/0166248 A1 | 7/2005 | Blackketter et al. | | |
| 2005/0166256 A1 * | 7/2005 | Blackketter et al. | .......... | 725/135 |
| 2005/0240982 A1 | 10/2005 | Blackketter et al. | | |
| 2006/0294558 A1 * | 12/2006 | Morris et al. | .................... | 725/89 |
| 2007/0078715 A1 * | 4/2007 | Murakami | ....................... | 705/14 |

(Continued)

*Primary Examiner* — Brian Pendleton
*Assistant Examiner* — Jonathan V Lewis
(74) *Attorney, Agent, or Firm* — Lowe Graham Jones PLLC

(57) ABSTRACT

Systems and methods for providing travel information associated with a presently viewed media content event. An exemplary method receives a selection for a media content event, receives a media content stream corresponding to the selected media content event, communicates the selected media content event to a media presentation device, communicates to the media presentation device a travel indicator during communication of the media content event, receives a user selection associated with the travel indicator, and presents travel information to the user based on the received user selection. The travel information is based on an analysis of content of the EPG information. The media content event is paused after receiving the user selection of the travel indicator. The travel information associated with the media content event is saved after receiving the user selection of the travel indicator.

18 Claims, 4 Drawing Sheets

(56) References Cited

U.S. PATENT DOCUMENTS

| | | | |
|---|---|---|---|
| 2007/0174042 A1* | 7/2007 | Thompson | 704/3 |
| 2008/0092159 A1* | 4/2008 | Dmitriev et al. | 725/34 |
| 2008/0172696 A1* | 7/2008 | Furusawa et al. | 725/46 |
| 2009/0138906 A1* | 5/2009 | Eide et al. | 725/32 |
| 2009/0165051 A1* | 6/2009 | Armaly | 725/40 |
| 2009/0172739 A1 | 7/2009 | Blackketter et al. | |
| 2010/0293576 A1* | 11/2010 | Hnyk et al. | 725/41 |
| 2011/0197220 A1* | 8/2011 | Rowe et al. | 725/32 |
| 2011/0321095 A1* | 12/2011 | Yao et al. | 725/41 |

* cited by examiner

APPARATUS, SYSTEMS AND METHODS FOR PROVIDING TRAVEL INFORMATION RELATED TO A STREAMING TRAVEL RELATED EVENT

BACKGROUND

Media devices, such as a set-top box, a stereo, a television, a computer system, a game system, or the like, are often configured to receive media content events. A media content event is communicated as part of a media content stream that includes a video stream portion and an audio stream portion. Nonlimiting examples of media content events communicated in a media content stream include, but are not limited to, a television program, a newscast, a broadcast sports event, a movie, or the like.

Currently, when streaming media content includes some interesting travel-related information, the viewer must separately access a travel company (e.g., Expedia, Travelocity, etc.) in order to see what travel options are available to the travel location included in the streaming media content.

Accordingly, there is a need in the art to provide a more user-friendly experience for viewers with interest in travel options related to streaming media content.

SUMMARY

Exemplary embodiments provide travel information associated with a presently viewed media content event that includes a travel event. An exemplary method receives a selection for a media content event, receives a media content stream corresponding to the selected media content event, communicates the selected media content event to a media presentation device, communicates to the media presentation device a travel indicator during communication of the media content event, receives a user selection associated with the travel indicator, and presents travel information to the user based on the received user selection. The travel information is associated with the media content event.

In one aspect, the travel information is previously generated based on an analysis of content of the electronic program guide (EPG) information. The analysis of the content of the EPG information includes identifying travel related words in a description portion of the EPG information.

In another aspect, the travel information is previously generated based on an analysis of audio content of the media content event.

In still another aspect, the media content event is paused after receiving the user selection of the travel indicator.

In yet another aspect, travel information associated with the media content event is saved after receiving the user selection of the travel indicator.

BRIEF DESCRIPTION OF THE DRAWINGS

Preferred and alternative embodiments are described in detail below with reference to the following drawings.

DETAILED DESCRIPTION

Figure 1:
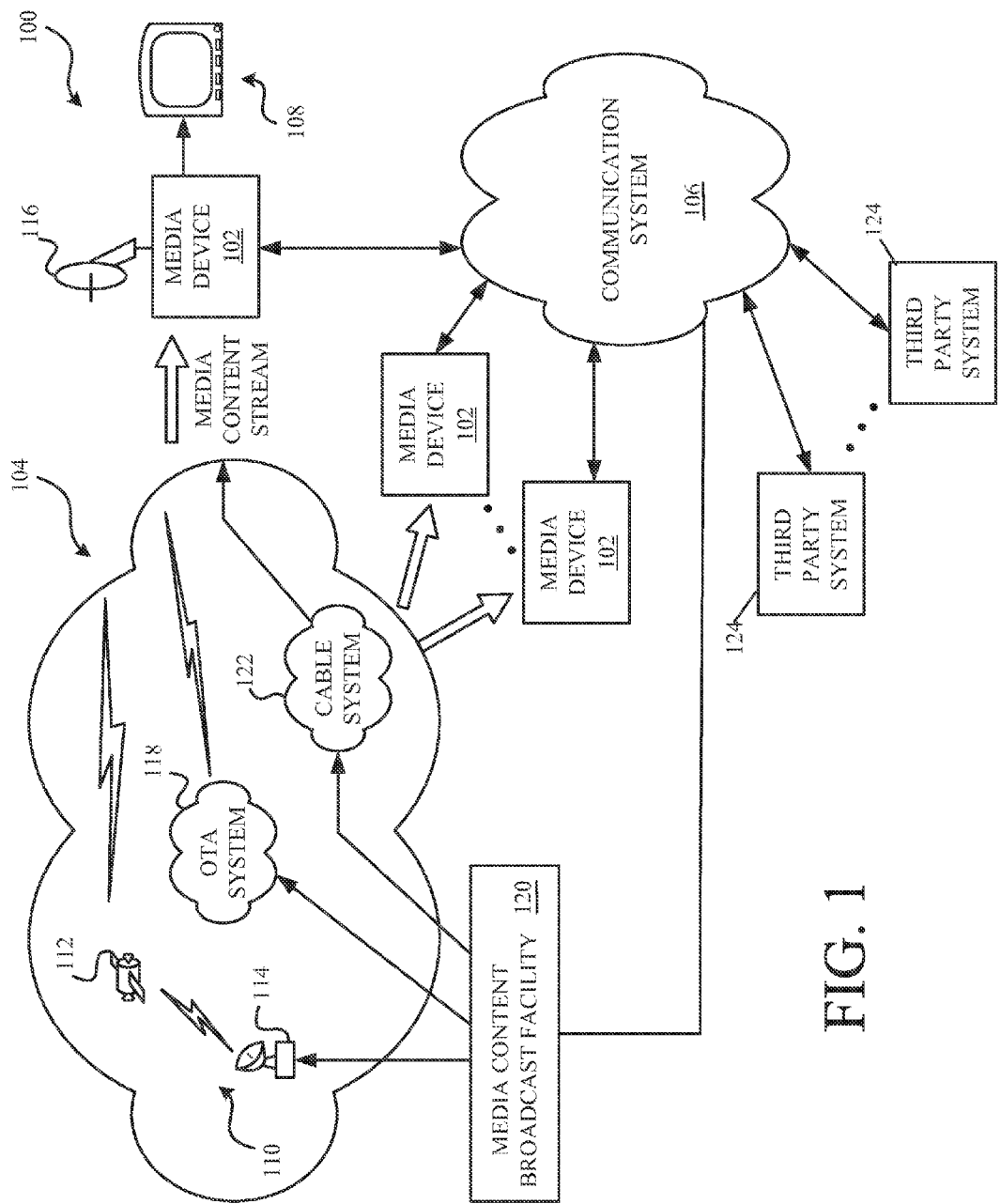
FIG. 1 is a block diagram of an embodiment of a metadata system.

FIG. 1 is a block diagram of an embodiment of a video and information acquisition system 100. The exemplary embodiment of the video and information acquisition system 100 is implemented in an exemplary environment that includes a plurality of media devices 102, a broadcast system 104, and a communication system 106.

The media devices 102, when in operation, are configured by a user to select one of the plurality of simultaneously broadcast media content events for presentation on a media presentation system 108. An exemplary media device 102 includes, but is not limited to, a set-top box (STB) that is communicatively coupled to the broadcast system 104. Other embodiments of the media device 102 include a television (TV), a digital video disc (DVD) player, a game-playing device, a personal computer (PC), a cellular phone, a portable media device, or a personal digital assistant (PDA). The media devices 102 present and/or store selected media content events that are included in the media content stream. Exemplary media presentation systems 108 include, but are not limited to, TVs, stereos, radios, surround-sound systems, personal computers, or the like that may be communicatively coupled to the media device 102. In some embodiments, the media device 102 and the media presentation system 108 may be a single integrated electronic media device, such as a PDA.

The media devices 102 may be identical to, or may be substantially similar to, other media devices 102. Or, the media devices 102 may be quite different from each other. Further, the media devices 102 may be coupled to different types of broadcast systems 104.

An exemplary broadcast system 104 includes a satellite broadcast system 110. One or more of the media content streams resides in a transport channel that is uplinked to a plurality of satellites 112, via a corresponding transmit antenna 114. The respective transport channels are then wirelessly communicated, from one or more of the satellites 112 to a receiver antenna 116 that is communicatively coupled to the media device 102. The received wireless signal (with the media content stream) is then communicated from the receiver antenna 116 to the media device 102. In one embodiment, the receiver antenna 116 and the media device 102 receive multiple wireless signals from a plurality of satellites 112.

Alternatively, or additionally, the plurality of media content events are broadcast to the media devices 102 via an over-the-air (OTA) system 118. For example, the media content broadcast facility 120 may be a local program provider that wirelessly broadcasts media content events to the media devices 102. The wireless signal with the media content stream is received at the receiver antenna 116, or is received directly by a receiver (not shown) residing in the media device 102.

Alternatively, or additionally, the plurality of media content events are broadcast to the media devices 102 via a cable system 122. For example, the media content broadcast facility 120 may employ a coaxial cable, fiber optic cable, or comparable cable that is coupled to the media device 102 for transmitting the media content stream.

Alternatively, or additionally, the media device 102 may receive the media content event directly from the media content broadcast facility 120 or from another source over the communication system 106, via a communication (network) link. In an exemplary embodiment, the communication system 106 includes a public (the Internet) or private data network. The communication link between the media device 102 and the communication system 106 may be a dedicated communication link, such as an Ethernet communication link, a fiber optic communication link, a wireless link, a cable link, or the like. In some embodiments, the communication links may be established through the communication system 106, or may be established through a portion of the communication system 106.

The media content broadcast facility 120 is also in communication with one or more third party systems 124. The media content broadcast facility 120 transmits electronic program guide (EPG) information or other program related information (e.g., on-demand or push media content/assets) to the third party system 124 via the communication system 106. The third party system 124 generates travel information for any of the programs listed in the EPG or other catalog of assets (i.e., on-demand or push media content/assets). The third party system 124 sends any generated travel information back to the media content broadcast facility 120 or directly to the media device 102 via the communication system 106.

Figure 2:
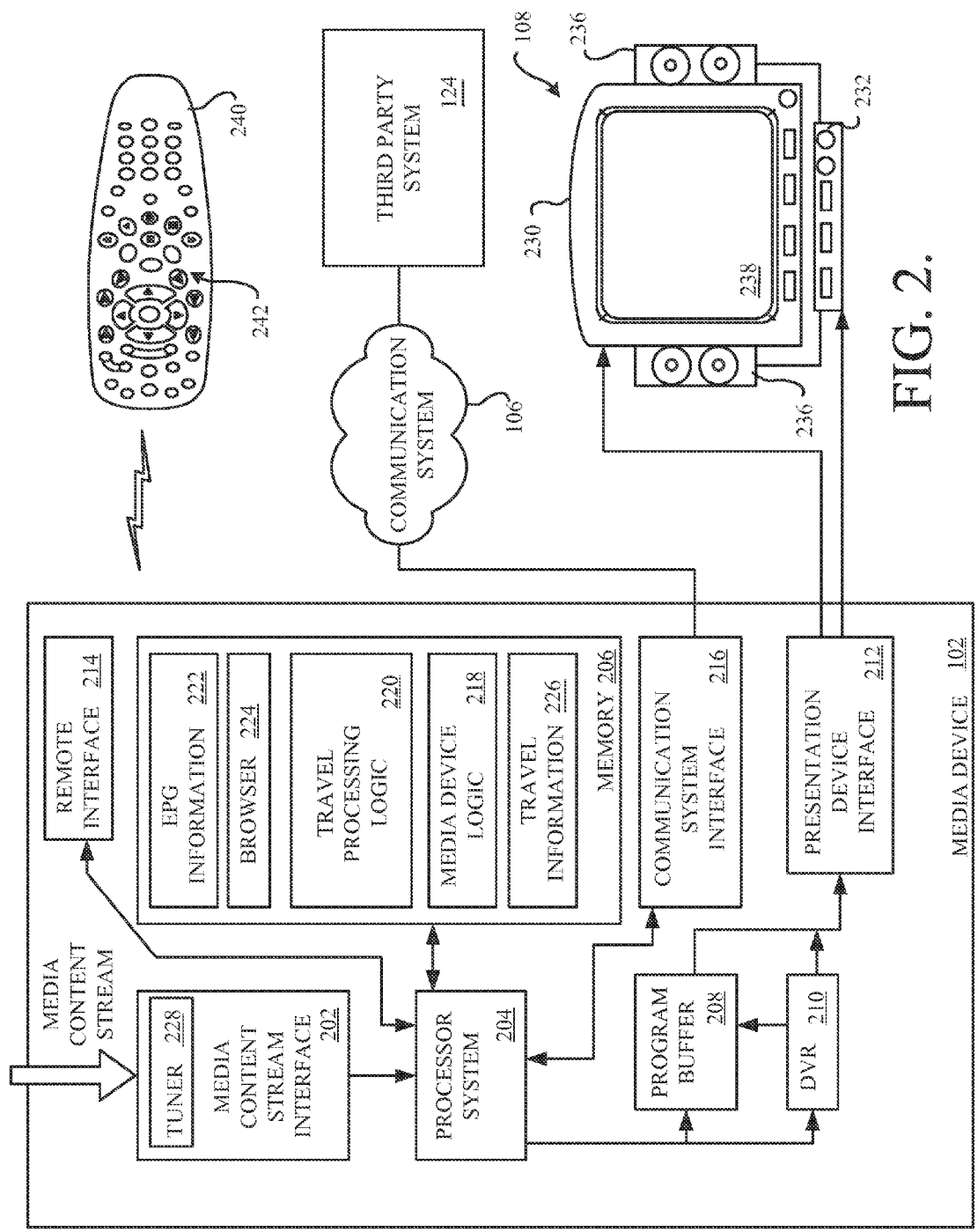
FIG. 2 is a block diagram of an embodiment of an exemplary media device.

FIG. 2 is a block diagram of an embodiment of an exemplary media device 102. The nonlimiting exemplary media device 102 includes a media content stream interface 202, a processor system 204, a memory 206, a program buffer 208, an optional digital video recorder (DVR) 210, a presentation device interface 212, a remote interface 214, and an optional communication system interface 216. The memory 206 stores media device logic 218, travel processing logic 220, electronic program guide (EPG)/catalog of assets information 222 and a browser 224. In one embodiment, some or all of these memory and other data manipulation functions may be provided by using a remote server or other electronic devices suitably connected, via the communication system 106 or otherwise, to the media device 102. Other media devices may include some, or may omit some, of the above-described media-processing components. Further, additional components not described herein may be included in alternative embodiments. The memory 206 also includes a travel information section 226 received directly or indirectly from the third party system 124.

In an exemplary embodiment, the media content stream is received by the media content stream interface 202. One or more tuners 228 in the media content stream interface 202 selectively tune to a particular media content stream in accordance with instructions received from the processor system 204. The processor system 204, executing the media device logic 218 and based upon a request for a program of interest specified by a user, parses out program content associated with the specified media content event. The media content event of interest is then assembled into a stream of video and/or audio information which may be stored by the program buffer 208, such that the program content can be streamed out to the media presentation system 108, via the presentation device interface 212. Alternatively, or additionally, the parsed-out program content may be saved into the DVR 210 for later presentation. The DVR 210 may be directly provided in, locally connected to, or remotely connected to the media device 102.

In this embodiment, the presentation device interface 212 is illustrated as coupled to the media presentation system 108 that includes a visual display device 230, such as a television (hereafter, generically, a TV), and an audio presentation device 232, such as a surround-sound receiver (that includes one or more speakers 236). Other types of presentation devices may also be coupled to the media device 102, including those providing any sort of stimuli sensible by a human being, such as temperature, vibration, and the like. The video portion of the streamed program content is displayed on the TV display 238 and the audio portion of the streamed program content is reproduced as sounds by the plurality of speakers 234.

From time to time, information populating the EPG information 222 portion of the memory 206 is communicated to the media device 102. The EPG information 222 stores information pertaining to the scheduled programming for the media content events. The EPG information 222 may include, but is not limited to, a scheduled presentation start and/or end time, a program channel, and descriptive information of the media content events. The descriptive information of the media content events may include the title, names of performers or actors, date of creation, and a summary describing the nature of the media content event. In some embodiments, the summary describing the nature of the media content event includes travel information. Upon receipt of a command from the user requesting presentation of an EPG, the information in the EPG information 222 is retrieved, formatted, and then presented on the display 238.

The exemplary media device 102 is configured to receive commands from a user via a remote control 240. The remote control 240 includes one or more controllers 242. The user, by actuating one or more of the controllers 242, causes the remote control 240 to generate and transmit commands, via a wireless signal, to the media device 102. The commands control the media device 102 and/or control the media presentation systems 108. The wireless signal may be an infrared signal or an RF signal.

The above processes performed by the media device 102 are generally implemented by the processor system 204 while executing the media device logic 218. Thus, the media device 102 may perform a variety of functions relating to the processing and presentation of the media content event.

The communication system interface 216 is configured to provide connectivity of the media device 102 to other remote devices (e.g., the third party system 124) via the communication system 106. In an exemplary embodiment that is configured with Internet connectivity, the communication system interface 216 may be a suitable modem, or a device configured to connect to a modem. For example, the exemplary browser 228 may be used to access and/or retrieve the data from a remote site, such as a web site. The accessed data may be searched, filtered, sorted or otherwise processed at the media device 102. Additionally, or alternatively, the retrieved data may be stored by the media device 102, such as in the DVR 210, memory 206, or another suitable memory medium. Travel information received from the third party system 124 or the media content broadcast facility 120 is stored in the travel information section 226. The communication system interface 216 may be any suitable device that is configured to provide connectivity of the media device 102 to the communication system 106.

Figure 3:
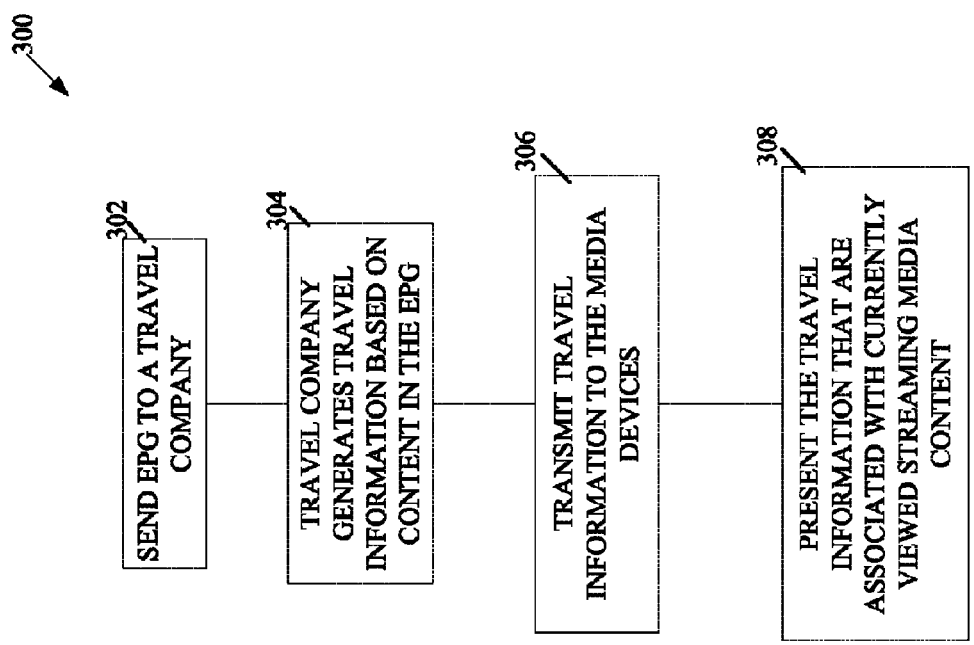
FIG. 3 is a flowchart of an exemplary process performed by the systems shown in FIGS. 1 and 2.

FIG. 3 illustrates an exemplary process 300 performed by the systems shown in FIGS. 1 and 2. First, at a block 302, EPG information is sent to a third part system 124, such as the exemplary travel company 124, from the media content broadcast facility 120 or from the media device 102. In an exemplary embodiment, only the descriptive information of travel related media content events or descriptive information of media content events on travel related channels are sent to the travel company 124.

At a block 304, the travel company 124 analyzes the content, such as the text, of a description portion of the EPG information to identify travel related words to determine if the travel company 124 can create travel information related to the based EPG information. In an exemplary embodiment, the descriptive information of travel related media content events or descriptive information of media content events on travel related channels are analyzed to determine if the travel company 124 can create travel information related to the analyzed text. Since the descriptive information is associated with a presentation (i.e., media content event) in the media content stream, the travel information is associated with the same presentation.

At a block 306, the travel information is transmitted to the media devices 102. The travel information may include travel package(s) and/or travel information pertaining to the linked media content event and/or a user interface that allows a user to access travel information at the travel company 124.

The travel information may be transmitted various ways to the media device 102. In an exemplary embodiment, the travel information may be transmitted to the media content broadcast facility 120. The media content broadcast facility 120 transmits the travel information to the media device 102. Alternatively, or additionally, the travel company 124 may directly send the travel information to the media device 102 via a communication link that is established over the communication system 106.

In an exemplary embodiment, the travel company 124 sends the travel information without receiving a positive request to do so. A positive request is a request for the travel information generated by the user or another entity. In other words, after the travel company 124 creates the travel information, the travel information is sent and received by a plurality of media devices 102. In this embodiment, the media devices 102 receive the travel information prior to broadcast of the media content event associated with the travel information. Thus, the processor system 204 stores the travel information into the travel information section 226 of the memory 206. The travel information is accessed from memory 206 when the associated media content event is outputted for presentation to the media presentation system 108 according to the travel processing logic 220.

In an exemplary embodiment, the travel company 124 sends the travel information upon receiving a positive request from the media device 102. This is considered a real-time request. As a viewer is watching a media content event, the processor system 204 transmits descriptive information associated with the currently viewed media content event to the travel company 124. At that time, the travel company 124 analyzes the received descriptive information, creates travel information associated with the descriptive information, and transmits the created travel information to the media device 102 that sent the descriptive information.

Figure 4:
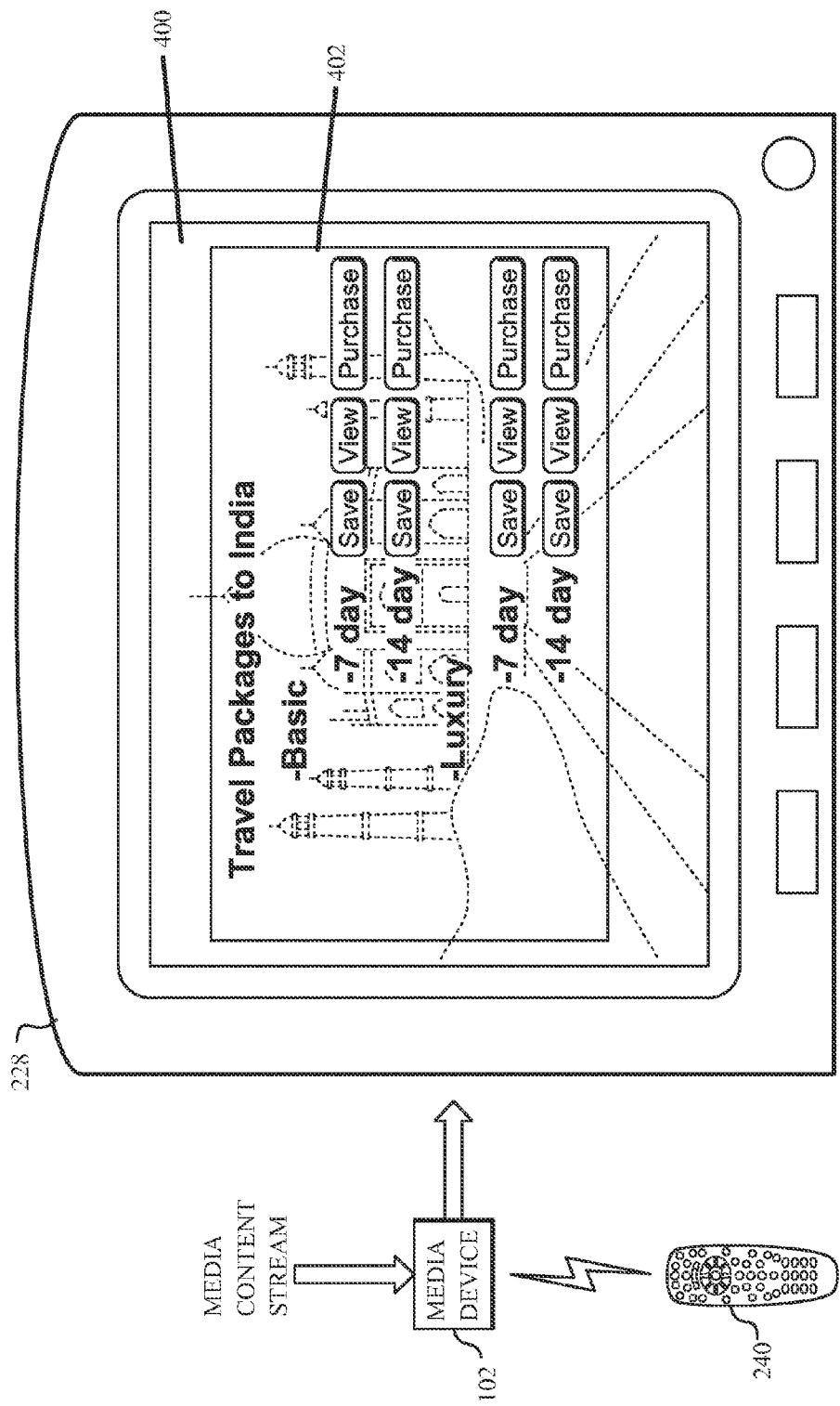
FIG. 4 illustrates a media presentation system showing streaming media content with related travel information presented during viewing of the streaming media content.

At a block 308, the processor system 204 presents the transmitted travel information (packages, etc.) when the associated media content event in the media content stream is outputted to the media presentation system 108, according to the travel processing logic 220. An example of this is shown in FIG. 4 below.

In another embodiment, the travel processing logic 220 includes audio analysis logic that analyzes an audio component of a particular media content event presently outputted to the media presentation system 108. The audio analysis logic optionally determines if there exists travel-related information different from that listed in the descriptive information in the EPG or that is included in any previously retrieved travel information section 226. The determined travel-related information is then sent to the travel company 124, such as is performed at block 306 of FIG. 3.

For example, the descriptive information just describes that a travel program host travels to Mumbai, India. However, the analyzed audio reveals a particular hotel as the travel program host is discussing the hotel with a guide. The audio analysis logic may cause the processor system 204 to send a query to the travel company 124. The query includes a request for travel information for the identified hotel. The travel company 124 then returns travel information for that hotel to the media device 102. The processor system 204 will then present the hotel travel information to the user.

The processor system 204 may also send user selection information from the travel interface (i.e., controlled by the user) to the travel company 124. The user selection information may include a selection of type of travel, travel dates, travel preferences, payment information, or any other information that would be useful in preparing a travel package or completing a transaction associated with a previously prepared travel package. In an exemplary embodiment, some of the user information may be stored at the travel company 124, such as payment information, user personal information, or the like.

In another embodiment, user information may be previously stored at a number of locations remote from the media device 102 as well as at the media device 102. For example, the travel company 124 may already include user profile and payment information. This will enable the travel company 124 to more easily process a transaction when the user decides to purchase a presented travel package.

FIG. 4 shows the media presentation system 108 that is outputting a travel show presentation 400 of a trip to India. Superimposed over the streaming travel show presentation 400 is a travel information user interface 402 retrieved from the travel information section 226 or from one of the third party systems 124 according to the travel processing logic 220. The presented travel information user interface 402 indicates that the user may select to view or save for later view any of a number of predefined travel packages to India. These travel packages are to India because the travel show presentation 400 is of a trip to India. The travel information user interface 402 was previously received from the third-party system 124 based on a determination that the travel show presentation 400 was of a trip to India.

In an exemplary embodiment, when the travel processing logic 220 determines that there exists travel information associated with a media content event (e.g., streaming travel show presentation 400) in the media content stream, the travel processing logic 220 may cause the processor system 204 to output a travel indicator to the viewer that there is available travel information for the media content event.

In an exemplary embodiment, the travel processing logic 220 outputs the travel indicator in response to a trigger included in the media content stream. The trigger may be a clue for the travel processing logic 220 to check the memory 206 to determine if there is any travel information stored for the currently viewed media content event. The trigger may be embedded into any suitable location in the streaming media content, such as in a selected image frame, a selected point in the metadata, or the like. Alternatively, or additionally, if there exists travel information stored for the currently viewed media content event, then the travel processing logic 220 causes the processor system 204 to output the travel indicator to the viewer.

In an exemplary embodiment, the travel indicator is an icon that appears on the media presentation system 108. When a user selects or activates the icon, the travel information stored for the currently viewed media content event is presented to the user.

In another exemplary embodiment, the travel indicator is an information button 232 that may be highlighted and/or predefined on the remote control 240. When a user selects or activates the highlighted information button 242, the travel information stored for the currently viewed media content event is presented to the user.

In still another exemplary embodiment, the travel indicator is an icon displayed on a touch screen of the remote control 240. When a user selects or activates the icon on the touch screen, the processor system 204 will present the travel information related to the media content event that is stored in the travel information section 226.

In another exemplary embodiment, activation of the indicator may cause the processor system 204 to send a request to the third party system 124 for travel information related to the media content event. The third party system 124 will return travel information associated with the media content event as previously determined by the third party system 124 as described above. The processor system 204 then presents the returned travel information over the media presentation system 108.

In an exemplary embodiment, activation of the indicator may cause the processor system 204 to save travel information associated with the media content event within the memory 206 or at the travel company 124. The user can then interact with the saved travel information at a later time.

In an exemplary embodiment, the processor system 204 pauses the media content event and saves the media content event in the program buffer 208 and/or the DVR 210 after receiving a selection of the indicator. This embodiment allows a user to then to interact with the travel interface. When the user has completed interaction with the travel interface, the media content event resumes presentation from the point the media content event was paused.

It should be emphasized that the above-described embodiments of the video and information acquisition system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method comprising:
   receiving, at a media device, a selection from a user for presentation of a media content event;
   receiving, at the media device, a media content stream corresponding to the selected media content event;
   receiving, at the media device, first travel information from a travel company, wherein the first travel information is associated with a first travel location and was generated by the travel company based on electronic program guide (EPG) information received by the travel company;
   communicating, from the media device, the selected media content event to a media presentation device, wherein the media content event is presented on the media presentation device to the user;
   communicating, from the media device, a travel indicator to the media presentation device during communication of the media content event, wherein the travel indicator is presented concurrently with the media content event on the media presentation device to the user;
   receiving a user selection associated with the travel indicator; and
   presenting the first travel information to the user based on the received user selection, wherein the first travel information is associated with the media content event, the method further comprising:
   analyzing, at the media device, audio content of the media content event to identify a second travel location that is different from the first travel location, wherein the second travel location is a hotel that a travel program host is discussing in the audio content of the presented media content event;
   communicating a request to the travel company for second travel information that provides information for the user to prepare for travel to the hotel, wherein the request identifies the second travel location;
   receiving the second travel information from the travel company in response to communicating the request, wherein the second travel information describes a travel package for travel by the user to the second travel location.

2. The method of claim 1, wherein the first travel information generated by the travel company is based on an analysis of content of the electronic program guide (EPG) information that describes scheduled programming for and the nature of each of a plurality of media content events, or wherein the first travel information generated by the travel company is based on an analysis of content of on-demand information that describes the nature of a plurality of on-demand media content events.

3. The method of claim 2, wherein the analysis of the content of the EPG information or the on-demand information comprises identifying travel related words in text of a description portion of the EPG information or in text of the on-demand information.

4. The method of claim 1, further comprising presenting travel package information.

5. The method of claim 1, further comprising:
   pausing the media content event in response to receiving the user selection of the travel indicator, wherein the first travel information is presented to the user while the media content event is paused;
   ending presentation of the first travel information; and
   resuming presentation of the media content event from a point that the media content event was paused.

6. The method of claim 1, wherein the first travel information from the travel company is received with the broadcast of the media content event, and further comprising:
   saving the first travel information associated with the media content event after receiving the user selection of the travel indicator, wherein the user may interact with the saved travel first travel information at a later time.

7. A media device comprising:
   a tuner configured to:
      receive a first one of a plurality of media content streams, wherein each media content stream comprises a plurality of media content events; and
      receive a broadcast of first travel information associated with at least one of the media content events, wherein the first travel information was previously generated by a travel source system based on electronic program guide (EPG) information received by a travel company, wherein the first travel information is associated with a first travel location;
   a remote interface configured to receive a user selection associated with a travel indicator that is associated with the first travel information;
   a processor system communicatively coupled to the tuner and the remote interface, the processor system configured to:
      present the selected one of the media content events on a media presentation device;

present the travel indicator with the presented selected media content event on the media presentation device if the selected media content event includes the first travel information associated with the travel indicator;

analyze audio content of the media content event to identify a second travel location that is different from the first travel location, wherein the second travel location is a hotel that a travel program host is discussing in the audio content;

communicate a request to the travel company for second travel information that provides information for the user to prepare for travel to the hotel, wherein the request identifies the second travel location; and receive the second travel information from the travel company in response to communicating the request, wherein the second travel information describes a travel package for travel by the user to the second travel location.

8. The media device of claim 7, wherein the first travel information associated with a first one of the plurality of media content events, and further comprising:

a communication system interface configured to communicatively couple to a communication system, wherein third travel information is received at the communication system interface from the travel source system via the communication system, wherein the third travel information is associated with a second one of the plurality of media content events, wherein the third travel information was previously generated by a travel source system based on the EPG information received by the travel company, and wherein the third travel information is received prior to a broadcast of the second one of the plurality of media content events.

9. The media device of claim 7, further comprising:

a memory configured to save the first travel information associated with the media content event, wherein the broadcasted first travel information is stored in the memory of the media device prior to a broadcast of the selected media content event.

10. A method comprising:

receiving, at a travel source system, media content event information described in a text description portion of an electronic program guide (EPG), wherein the text description portion of the EPG describes the nature of each one of a plurality of broadcasted media content events or a plurality of on-demand media content events, and wherein the EPG is received at the travel source system prior to the broadcasting of the plurality of media content events;

analyzing the received media content event information in the received EPG to identify a first travel location associated with at least one of the plurality of media content events;

generating, at the travel source system, first travel information if the analysis identifies the first travel location, wherein the generated first travel information describes information about the first travel location; and sending, from the travel source system, the generated first travel information to at least one of a plurality of media device, wherein the at least one media device receiving the first travel information identifies a second travel location that is different from the first travel location based upon analyzed audio content of one of the plurality of media content events, and wherein the second travel location is a hotel that a travel program host is discussing in the audio portion of the presented media content event, the method further comprises:

receiving a request from the at least one media device for second travel information about the second travel location; and sending the second travel information from the travel company to the requesting one at least one media device in response to receiving the request, wherein the second travel information describes at least a travel package for travel by the user to prepare for travel to the hotel.

11. The method of claim 10, wherein receiving the media content event information comprises receiving at least one of EPG information or on-demand information and wherein analyzing comprises analyzing content of the EPG information or the on-demand information.

12. The method of claim 10, wherein analyzing comprises identifying travel related words in the text description portion of the EPG information that describes the nature of the plurality of broadcasted media content events or the plurality of on-demand media content events.

13. The method of claim 10, wherein the first travel information that describes information about the first travel location, and further comprising:

receiving, at the travel source system, the audio content for one of the plurality of broadcasted media content events or on-demand media content events associated with the first travel location;

analyzing the audio content to identify the second travel location; and generating, at the travel source system, the second travel information if the analysis identifies the second travel location, wherein the generated second travel information describes information about the second travel location.

14. The method of claim 10, wherein sending the generated first travel information from the travel source system to the at least one of the plurality of media devices further comprises:

sending the first travel information to a media content broadcast facility, wherein the first travel information is broadcast from the media content broadcast facility to the plurality of media devices.

15. The method of claim 14, wherein the first travel information is broadcast from the media content broadcast facility to the plurality of media devices prior to broadcast of the media content event associated with the first travel information.

16. The method of claim 14, wherein the broadcast of the media content event associated with the first travel information includes a trigger that is associated with the first travel information, and wherein a presenting media device that is presenting the media content event associated with the first travel information to a user also presents a travel indicator associated with the first travel information upon receipt of the trigger in the broadcast media content event.

17. The method of claim 16, wherein the received broadcast first travel information is stored in a memory of each one of the plurality of media devices, and wherein the first travel information is retrieved from the memory of the presenting media device upon a user selection of the presented travel indicator.

18. The method of claim 10, wherein the broadcast of the media content event associated with the first travel information includes a trigger that is associated with the first travel information, wherein a presenting media device that is presenting the media content event associated with the first travel information to a user also presents a travel indicator associated with the first travel information upon receipt of the trigger residing in the broadcast media content event, and wherein sending the generated first travel information from the travel source system further comprises:

receiving a request from the presenting media device for the first travel information, wherein the presenting media device transmits the request in response to user selection of the presented travel indicator; and transmitting the first travel information to the presenting media device, wherein the first travel information is communicated to the presenting media device via a communication system established between the travel source system and the presenting media device.

\* \* \* \* \*